B. B. WELLS & L. W. LAPP.
CONTROLLING MECHANISM FOR AUTOMOBILES.
APPLICATION FILED FEB. 3, 1913.

1,221,122.

Patented Apr. 3, 1917.
6 SHEETS—SHEET 1.

Fig. 1
Fig. 11

WITNESSES
INVENTORS
BY
ATTORNEY

Fig. 3

UNITED STATES PATENT OFFICE.

BYRON BLISS WELLS AND LESLIE WALTER LAPP, OF COLUMBUS, OHIO; SAID LAPP ASSIGNOR TO SAID WELLS.

CONTROLLING MECHANISM FOR AUTOMOBILES.

1,221,122.  Specification of Letters Patent.  Patented Apr. 3, 1917.

Application filed February 3, 1913. Serial No. 745,981.

*To all whom it may concern:*

Be it known that we, BYRON BLISS WELLS and LESLIE WALTER LAPP, citizens of the United States, residing at Columbus, in the county of Franklin, State of Ohio, have invented certain new and useful Improvements in Controlling Mechanisms for Automobiles.

The invention relates to the mechanism used in connection with the clutch and the transmission mechanism, and has for its object the elimination of the necessity of using an extra lever to shift the gears in the transmission mechanism when the clutch has been released by other means.

Figure I of the drawings shows the chassis of an automobile provided with steering mechanism and motor; also clutch mechanism for releasing the motor from the driving mechanism of the machine. It also shows the gear box, in which is contained a series of gears for changing the speed ratio between the rear axle and the motor; also showing connecting means between the rear axle and the gear box, and the differential mechanism. All of these parts as enumerated are devices common to the art, and in the main there is no deviation from their regular construction.

Fig. II is a top view of the gear box having the top portion removed and also a top view of the mechanism which is used to shift the gears as desired. It also shows the clutch mechanism for disengaging the motor from the driving mechanism.

Fig. III is a view of the pedal and the parts coöperating with it to shift the gears in the gear box.

Fig. IV is a view of the clutch and the parts working in conjunction with the foot pedal to release the motor from the driving mechanism.

Fig. V is a view of the yoke and sleeve for disconnecting the clutch.

Fig. VI is a vertical view of the foot pedal and the mechanism connected with it. This is viewed from the position of the driver in operating the machine.

Figs. VII, VIII and IX are views of the indicator and foot-plate of the pedal.

Fig. X is a diagrammatical view of the guide plate for preventing the setting of the foot plate being changed during the operation of the foot pedal.

Fig. XI is a view of the worm and gear of the steering mechanism.

Figures 1, 11:
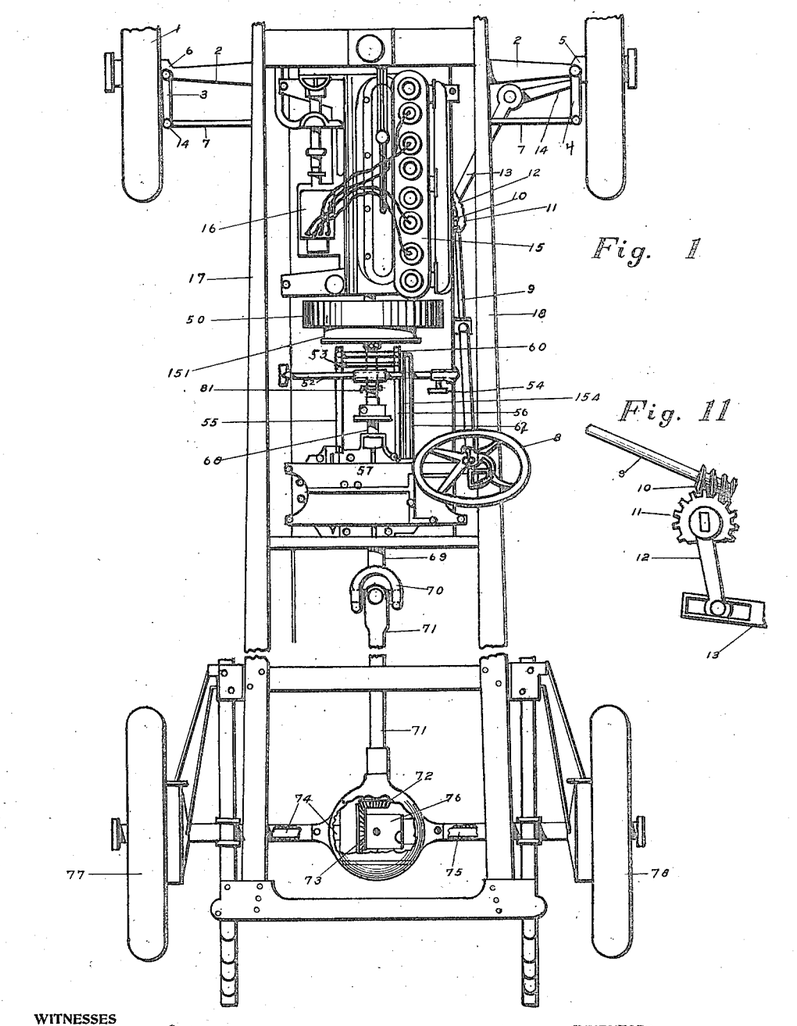
Figure 2:
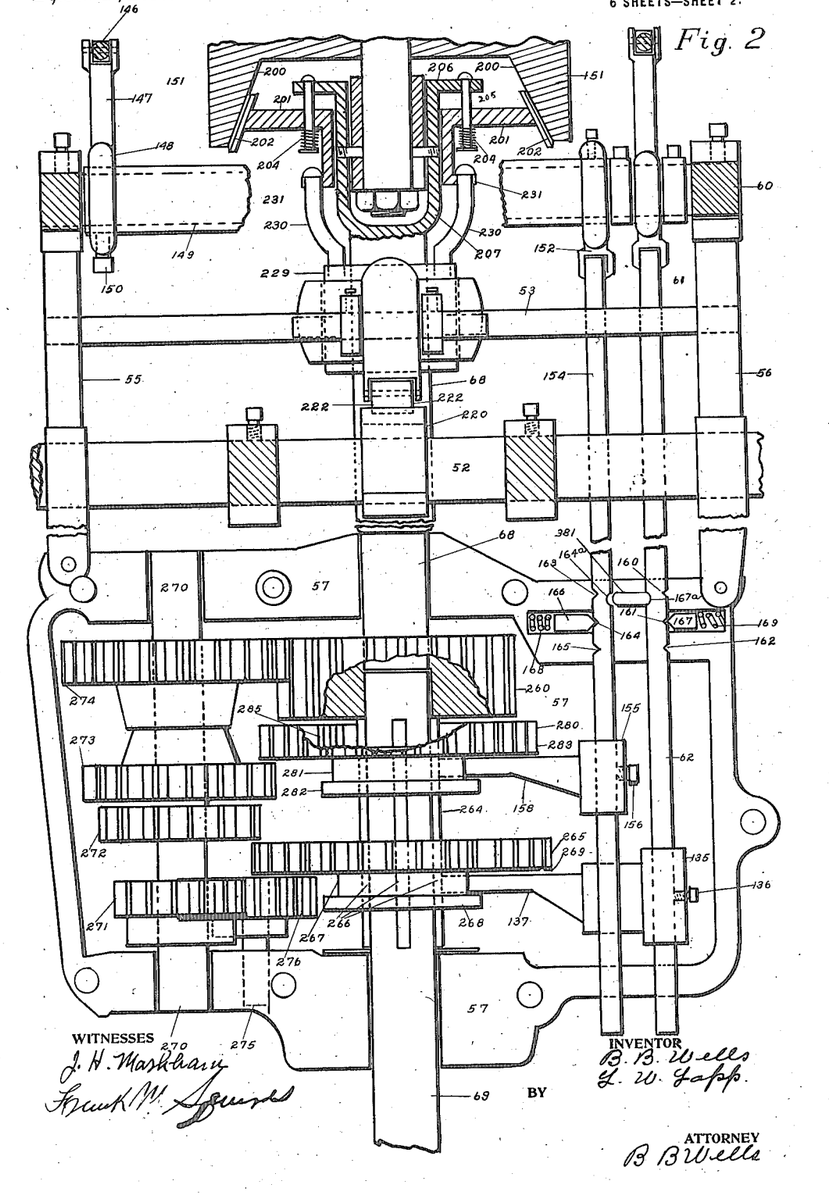
Figure 3:
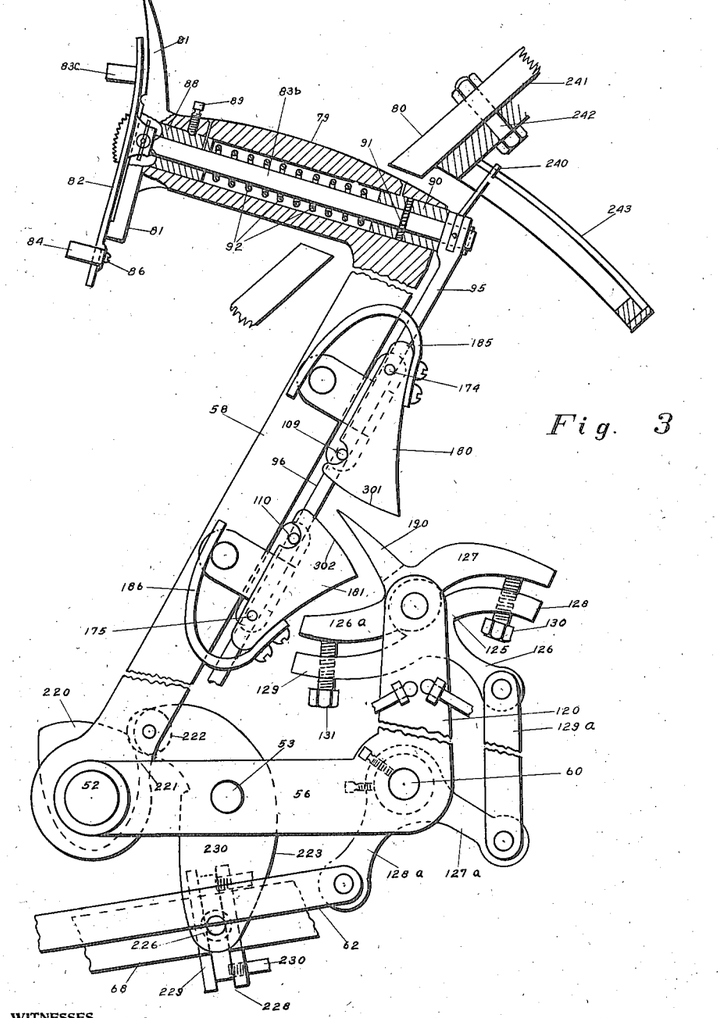
Figures 4, 5:
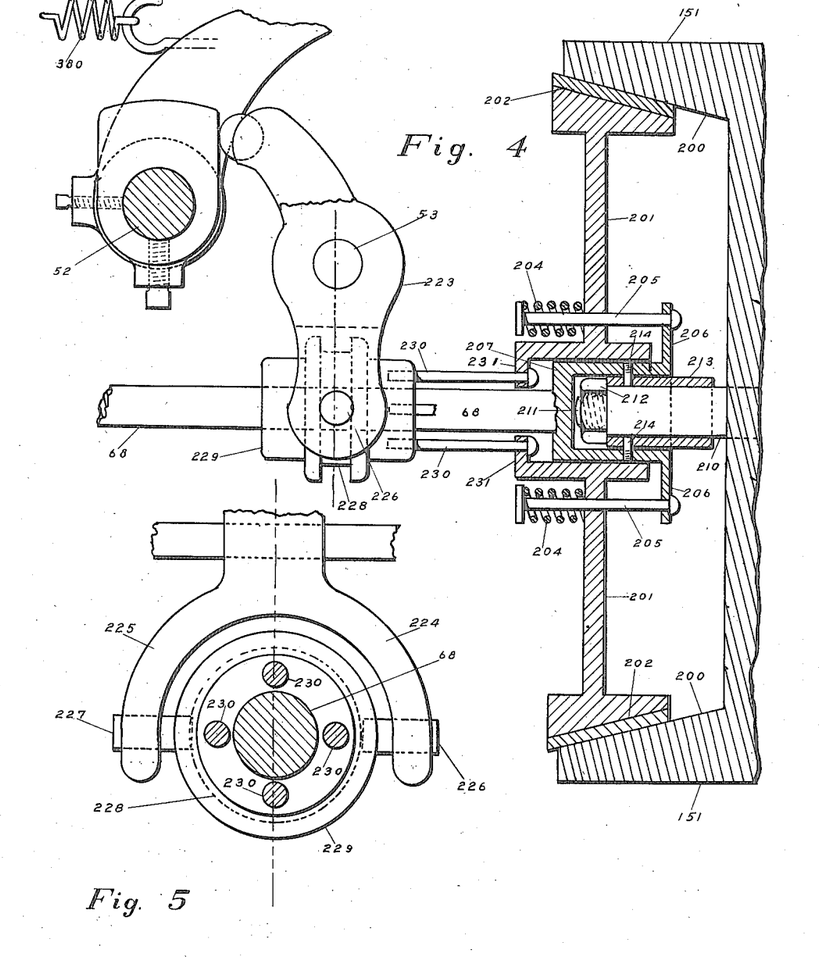
Figure 6:
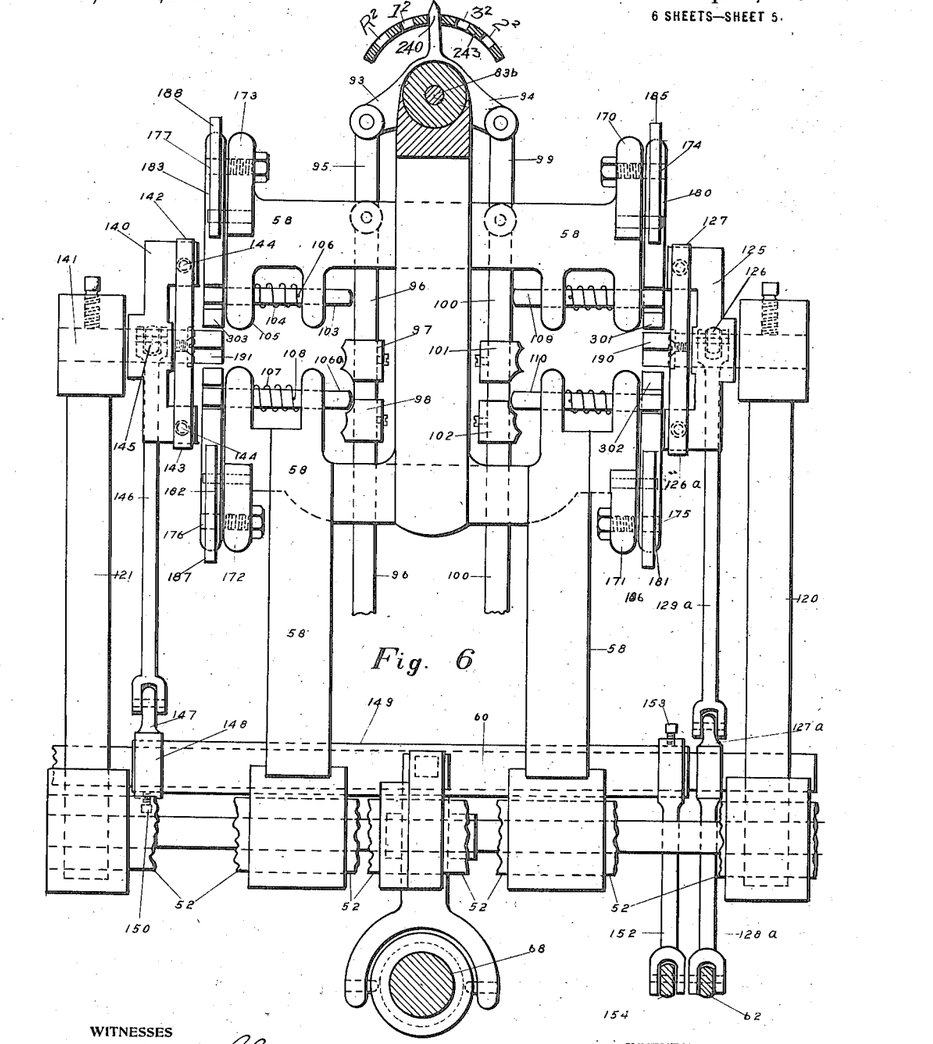
Figure 7:
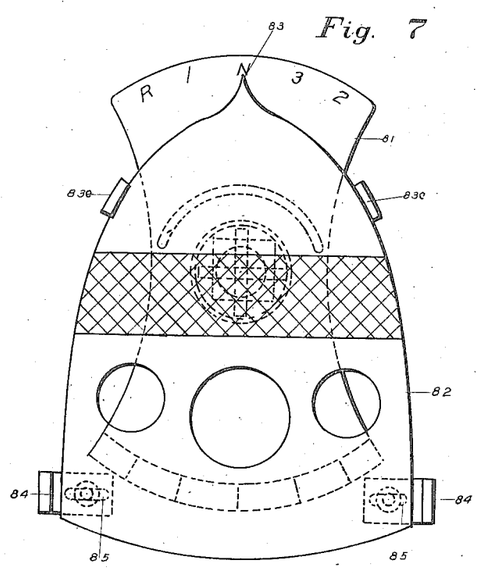
Figure 8:
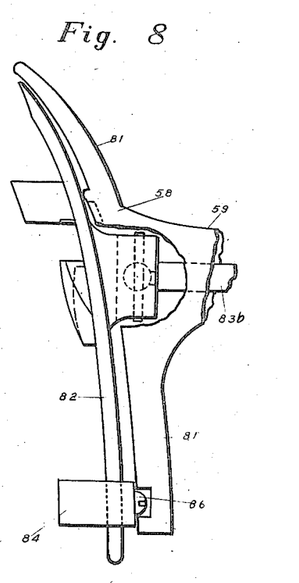
Figures 9, 10:
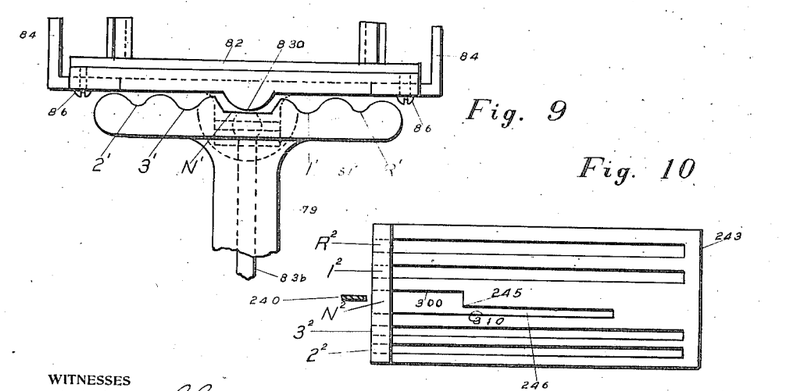

In Fig. I, 1, 1, are the front wheels pivoted to an axle 2 which supports the front portion of the frames 17 and 18; 3 and 4 are arms connected to the spindles 5 and 6; 7 is a rod attached to the ends of the arms 3 and 4, and holds the wheels 1 in a parallel position. The steering wheel 8 operates through a shaft 9 suitable worm and gear 10 and 11, which in turn operates through a lever 12 and a rod 13, which is in turn pivoted to an arm 14 integral with the arm 4: 15 is an internal combustion motor of a kind which is commonly used in the art, which is supplied with a source of electrical energy 16 for igniting gases after they have been compressed in the various cylinders.

The motor as shown in this drawing is of the usual four cycle type. The style of motor has no part in the invention as either gas, steam, electric or any other source of power is suitable to the invention.

50 is the balance wheel of the motor having a rearwardly extending portion 151, which is constructed to receive the clutch mechanism; 52 is a rod extending between the frames 17 and 18 of the machine and carrying the foot pedal 81 and the brake pedal 54. This rod 52 also supports bars 55 and 56. These bars 55 and 56 are fastened at their rear ends to the gear box 57.

Immediately in front of the rod 52 and supported by the bars 55 and 56 is a rod 53, which carries mechanism for releasing the clutch. This mechanism will be referred to later in the description.

Immediately in front of the rod 53 is a rod 60 which carries mechanism for operating the gears contained in the gear box 57. The rods 62 and 154 act in conjunction with the mechanism which is suspended on rod 60 to shift the gears contained in the box 57. All of these parts will be referred to later and full discussion of them given.

The shaft 68 is connected by suitable mechanism to the clutch and extends into the gear box 57. The shaft 69 extends from the rear end of the gear box 57 and operates the propeller shaft 71 through a universal joint 70.

Propeller shaft 71 has attached to its rear end a beveled pinion 72 which works in conjunction with a beveled gear 73. This bevel gear is connected to the shafts 74 and 75 through suitable differential mechanism 76. This differential mechanism is commonly known in the art and it is not necessary to describe its details.

The shafts 74 and 75 are fastened to the wheels 77 and 78. It is evident that the power generated by the motor 15 will be transmitted through the clutch mechanism to the shaft 68, which will in turn transmit it through the gears in the box 57 to the shaft 69. The shaft 69 in turn operating through the universal joint 70 drives the shaft 71, which in turn causes the shafts 74 and 75 to rotate through the action of the pinion 72 and the gear 73. The shafts 74 and 75 in turn transmit the power to the wheels 77 and 78.

The mechanism as above described is of the ordinary type which is commonly used in motor propelled vehicles.

In Figs. 3 and 6, 58 is a frame suspended on the rod 52 which extends upward and at its top has a forwardly projecting part 79 which extends through an opening in the foot board 80. The part 79 is the only portion of the frame visible to the driver, all the rest of the mechanism being concealed below the foot board 80. On the forward end of the part 79 is a vertical portion 81 extending upward and carrying at its top an index marked R 1 N 3 and 2.

This part 81 has at its bottom portion a series of notches 2' 3' N' 1' and R'. A plate 82 is attached to a rod 83 extending through the part 79 of the frame 58. Near the top portion and at the sides of plate 82 are rearwardly projecting parts 83$^c$. At the lower portion of the plate 82 are rearwardly projecting portions 84. These parts 84 have elongated holes 85 and screws 86 by which they are attached to the plate 82. These rearwardly projecting parts 84 on the plate 82 are so arranged that they can be adjusted to fit the shoe of the driver. The foot is placed on this plate and by turning the foot to right or to left the pointer 83 will be brought to indicate either of the positions R—1—N—3—2. As the plate is turned by the action of the foot the rounded portion 83$^a$ at the bottom of the plate will engage in the notches 2' 3' N' 1' R'.

The forward portion of the part 79 is a sleeve 88 through which the rod 83$^b$ passes. This sleeve is held in position by a set screw 89. At the rear end of the rod 83$^b$ is a sleeve 90 which is fastened rigidly to the rod 83$^b$ by a pin 91. About the rod 83$^b$ and between the sleeves 88 and 90 is a coiled spring 92. It is obvious that the action of this spring will be such that the projection 83$^a$ of the plate 81 will be held firmly in any one of the notches 2' 3' N' 1' R', in which it may be placed.

The plate 82 is attached to rod 83$^b$ by a swivel joint which allows the plate to have a free movement in passing from one notch to the other.

At the rear of the rod 83$^b$ are attached arms 93 and 94. These arms being fastened to the rod 83$^b$ in such a manner that they turn with it, it is obvious that as the plate 82 is moved to different positions the arms 93 and 94 will be moved to corresponding positions.

Attached to the arm 93 is a link 95 which connects to one end of a rod 96 which slides vertically in the frame 58. Fastened rigidly to rod 96 are blocks 97 and 98. Attached to the arm 94 is a link 99, which in turn is connected to the rod 100, which slides in the frame 58. The rod 100 carries blocks 101 and 102.

The rod 103 is carried by the frame 58 and has a coiled spring 104, one end of which acts against a projecting lug 105, and the other end of the spring contacts with a pin 106 in the rod 103. The tendency of the spring will be to move the rod toward the shaft 96. A rod 106$^a$ is also carried by lugs in the frame 58 and is moved toward the rod 96 by a spring 107 acting against a pin 108. Rods 109 and 110 have springs and pins similar to rods 103 and 106 and these rods 109 and 110 are likewise moved toward the rod 100 by their respective springs. It will be noticed that when the plate 82 points to the position N that the rod 106$^a$ is between the blocks 97 and 98, and that the pin 103 is some distance above the block 97. The rod 110 lies between the blocks 101 and 102 and the rod 109 is some distance above the block 101. If the plate 81 should be moved until the part 83 points to 1, it is obvious that the arm 94 operating through the link 99 will raise rod 100 carrying blocks 101 and 102 upward and the block 102 will come to the position to engage the rod 110 which will be moved to the right. The block 101 will then be in close proximity to the pin 109. It will also be noticed that while the arm 94 is being raised the arm 93 will be lowered, and that owing to the angle at which these arms are placed on the rod 83$^b$, the arm 94 will be moving the rod 100 through a maximum distance while the arm 93 will move the rod 96 through a minimum distance.

If the plate 82 be moved one notch farther until it comes to the position R, the arm 94 will be elevated to its highest position and the arm 93 will be lowered to its lowest position and the block 102 will be raised until it passes the rod 110 and the block 101 will be brought into contact with the rod 109. This will project the rod 109 to the right against the pressure of its spring.

The angle of the arms 93 and 94 with the rod 83$^b$ is such that while the arm 94 is being turned to its upward position, the block 97 will not be brought in contact with the rod 106ª.

If the plate 82 be moved to the position 3, the arm 94 will be depressed, the arm 93 being elevated, the block 98 will contact with the rod 106ª. If the plate 82 be moved farther to the position 2, the block 98 will pass from beneath the rod 106ª and the block 97 will then engage the pin 103.

While the rod 96 is having its maximum upward movement the rod 100 will be having its minimum downward movement and the blocks 101 and 102 will not contact with pin 110. It is obvious that the movement of the plate 82 will project the pins 103 and 106ª, 109 and 110 outward against the pressure of their respective springs. The outward movement of these pins is sufficient to bring them in the path of other parts with which they contact to move the shifting gears of the transmission case which correspond to the numbers as shown by the index on the plate 81.

The bars 55 and 56 at their forward ends have upwardly projecting parts 120 and 121. Pivoted to the upper portion of the arm 120 is a frame 125. Attached to the pivotal point of the frame 125 are arms 126ª and 127. The frame 125 has arms 128 and 129 which carry adjusting screws 130 and 131. These screws contact with the arms 126ª and 127 and are so arranged as to adjust the arms to any desired position. Extending forward from the frame 125 is an arm 126. Swinging on the rod 60 is a lever having arms 127ª and 128ª. The link 129ª connects the arms 126 and 127ª. The levers 127ª and 128ª are free to oscillate on the shaft 60. The rod 62 is attached to arm 128ª and extends backward and through the transmission case 57. The rod 62 carries a block 135 which is fastened to the rod 62 by a set screw 136. Attached to the block 135 is a shifting finger 137.

The mechanism suspended on the upwardly projecting portion of the arm 56 which has just been described, and which consists of mechanism suitable to move the arm 62 backward and forward in the transmission case, is placed at the right side of the frame 58. On the left side of the frame 58 is a series of pawls and levers similar to those just described, and which operate the rod 154 in a manner similar to the way in which the rod 62 is operated.

The arm 121 of the bar 56 carries at its upper portion a frame 140 which is pivoted with the stud 141. The stud 141 also carries levers 142 and 143 which are pivoted on the stud 141. The frame 140 carries screws 144 against which the outer ends of the levers 142 and 143 rest. These levers 142 and 143 are similar in shape and perform similar functions, as the levers 126ª and 127 previously described.

The frame 140 carries a rearwardly projecting portion 145 to the forward end of which is pivoted a link 146. This link extends downward and attaches to the forward end of an arm 147 which extends forward from the hub 148. The arm 147 is attached to a tube 149 by a set screw 150. The tube 149 extends over the shaft 60 which has its outer ends pivoted to the frames 55 and 56.

On the other end of tube 149 is fastened an arm 152 by a set screw 153. Attached to the lower end of the arms 152 is a rod 154 which extends rearwardly and into the transmission case 57.

The rod 154 carries a block 155, which is held in position on the rod 154 by a set screw 156. This block 155 carries a shifting finger 158.

In the sides of rods 62 and 154 are notches 160, 161, 162, 163, 164 and 165. In the frame of the transmission case are spring pressed plungers 166 and 167, which are controlled by springs 168 and 169, the springs holding the plungers in position to engage the notches on the rods 62 and 154.

Attached to the frame 58 at the points 170, 171, 172 and 173 by the pins 174, 175, 176 and 177 are cam plates 180, 181, 182 and 183. These cam plates are held normally in contact with the pins 109, and 110, 103 and 106ª, by springs 185, 186, 187 and 188.

The frames 125 and 140 have forwardly projecting cam portions 190 and 191.

The portion 151 of fly wheel 150 is provided with a cone shaped surface 200 which opens outward. A spider 201 has on its periphery a cone surface 202, conforming to the shape of the surface 200. The face 202 is provided with a leather or other suitable material to cause the spider 201 to engage the surface 202 and to produce sufficient friction to cause the spider 201 to rotate in unison with the fly wheel of the motor. The spider 201 is held into engagement with the fly wheel by compression springs 204, which are held in position by the bolts 205, the bolts extending through the spider 201 and being anchored on the flange 206 of a sleeve 207, which is attached to the propeller shaft 68.

The crank shaft 210 of the motor has a threaded portion 211, which carries a nut 212. The crank shaft 210 also carries a sleeve 213 which is free to rotate on the crank shaft 210, but is prevented from slipping off the shaft by the nut 212. After the sleeve 213 has been fastened in its position by the nut 212, the sleeve 207 is slipped over the sleeve 213 and the sleeves 207 and 213 are fastened together by pins 214.

It will be noticed that by this construction the propeller shaft 68, carrying the sleeve 207, to which is attached the sleeve 213 will be free to revolve on the portion of the crank shaft 210 and will be prevented from slipping off this bearing by the nut 130

212. The bolts 205 being anchored on the flange 206 of the sleeve 207 and extending through the spider 201 will cause the spider 201 and the propeller shaft 68 to rotate in unison. It will be noticed however, that the spider 201 can be drawn rearwardly against the tension on the spring 204 to disengage the spider 201 from the surface 200.

To disengage the spider and its mechanism from the fly wheel the following mechanism is employed.

On the shaft 52 is a circular cam 220 having a depressed portion 221 in which a roller 222 normally rests. Pivoted on the shaft 53 is a lever 223. This lever 223 carries at its upper end the roller 222. At the lower portion of the lever 223 are the arms of a yoke, 224 and 225. The arms of this yoke carry pins 226 and 227 which work in a groove 228 of a sleeve 229 carried by the propeller shaft 68. The sleeve 229 carries rods 230 which are fastened to a flange 231 of the spider 201.

The drawings show the clutch mechanism which consists of a spider 201 and its connected parts, together with its operating lever 223 in normal position and engaged with the fly wheel of the motor.

Extending upward from the hub which carries the arms 93 and 94 is an arm 240. Attached to the footboard 80 by a bolt 242 is a guide plate 243 having slots $R^2$ $1^2$ $N^2$ $3^2$ $2^2$.

When the frame 58 is in the normal or retracted position as shown in Fig. IV the arm 240 is free from the guide plate 243 so that it will not interfere with the movement of the foot plate 82 when it is desirable to shift its position to any of the positions $R^2$ $1^2$ $N^2$ $3^2$ or $2^2$. If however, the plate 82 should be moved to the position R and pushed forward the arm 240 would enter the slot $R^2$ of the plate 243, and so long as the pedal is held in a forward position the arm 240 being engaged in slot $R^2$ will prevent the plate 82 from being moved to any other position, and likewise if the plate should be moved to the position 1 and pressed forward, the arm 240 being engaged in the slot $R^2$, would prevent the plate from being moved from this position. Likewise for the positions $3^2$ and $2^2$. The slots $R^2$ $1^2$ $3^2$ and $2^2$ are of the same form and of the same length and each of them permits the frame 58 to be moved to its extreme forward position. The slot marked $N^2$, however, has a shoulder 245, the purpose of which will be explained later.

The portion 246 of the slot $N^2$ is shorter than slots $R^2$ $1^2$ $3^2$ and $2^2$, and does not permit the frame to move to its extreme forward position when the lever 240 is so placed that it will enter this slot $N^2$. This will also be explained later.

The gear case 57 contains a series of gears so arranged that they may be shifted to form various combinations which will give different ratios of speed between the portions 68 and 69 of the propeller shaft. The portion 68 of the propeller shaft has a bearing in the forward end of the transmission case and has attached to it a gear 260. The propeller shaft 69 has a bearing in the rear end of transmission case 57 and also a bearing in the pinion 260. The propeller shaft 69 is provided with a series of keys 264. Sliding on the propeller shaft 69 is a gear 265, which has key seats 266 corresponding to the keys 264. The gear 265 also has a hub 267 provided with a flange 268. A shifting finger 137 enters a groove formed by the flange 268 and the face 269 of the gear 265.

Mounted on a shaft 270, whose ends have bearings in the crank case 57 is a series of gears 271, 272, 273 and 274. All of these gears are attached firmly to the shaft 270 and all of them rotate in unison with the shaft. Immediately below, and slightly forward of the shaft 270 is a shaft 275 which carries a pinion 276, which engages normally the gear 271. The gear 276 is used in connection with the gear 271 to reverse the direction of revolution of the shaft 69, so that it will rotate in a counter direction to the shaft 68.

The gears 272 and 276 are so placed that the gear 265 may be moved laterally on the shaft 69 to engage either of the gears 272 and 276. The gear 274 is always in engagement with the gear 260 and it would be obvious that the countershaft 270 with the gears 271, 272, 273 and 274 will always receive a motion imparted to them whenever the gear 260 is in motion.

The shaft 69 carries a second gear 280 which has keyways corresponding to the keys 264 of shaft 69. The gear 280 is free to move laterally on the shaft 69. The gear 280 carries a hub 281 with a flange 282. A shifting finger 158 enters the recess formed by the flange 282 and the face 283 of the gear 280. The gear 280 has an internal portion 285 which matches the external portion of the gear 260 so that the gear 280 will slide over the gear 260 and by this means the shafts 68 and 69 will be caused to rotate in unison. The gear 273 is so placed that if the gear 280 is moved backward engagement will be formed between gears 273 and 280 and the shaft 69 will receive its motion through the train of gears 260, 274, 273 and 280. If the gear 265 is moved forward it will engage the gear 272. In this case the shaft 279 will receive its movement through the train of gears 260, 274, 272 and 265.

When the gear 265 is moved backward it will engage the gear 276 and the shaft 69 will receive its motion through the train of gears 260, 274, 271, 276 and 265. In this case the gear 276 will reverse the direction of rotation of the shaft 69.

The frame 58 has three distinct periods in its first cycle. The first period in the cycle will be to rotate the cam 220 so that the roller 222 will operate the lever 223 in such a manner as to draw the sleeve 229 rearwardly and in so doing will act through the rods 230 to engage the sleeve and the flange 231 of spider 201 and disengage surface 202 of the spider from the surface 200 of the fly wheel. This disengaging of this surface, from the driving mechanism, allows the motor to run free.

If during the first period of the cycle the foot plate 82 is turned slightly to the left until lever 240 engages the side 300 of the slot $N^2$, the frame will be stopped when the lever comes in contact with the shoulder 245 in the slot $N^2$. This shoulder 245 will prevent the frame 58 from entering the second period of its cycle so long as the arm 240 bears against the side 300 of the slot $N^2$. The frame 58 will go through the first period of the cycle when the lever 240 is placed in either of the slots $R^2$ $1^2$ $3^2$ and $2^2$, but there is nothing to prevent it from entering the second period.

The second period of the cycle of frame 58 is employed to move either of the gears 265 or 280 to their neutral position, so that the shaft 69 will disconnect entirely from the shaft 68.

These gears are thrown to neutral position in the following manner: Attached to the sides of frame 58 are cam plates 180, 181, 182 and 183, so arranged that their faces 301, 302, 303 and 304 will act against the cam levers 190 and 191. The distance between the cam faces 301 and 302, and 303 and 304 are just great enough to permit the cam levers 190 and 191 to pass between them when the frame 58 moves through the second period of its first cycle. It will be noticed that as these cam plates pass over the cam levers, the arms 126 and 145 which carry the links 129ª and 146 will operate through their respective levers to influence the rods 62 and 154 and move them to a position so that the spring pressed plunger 167 will engage the notch 161 in the rod 62 and the spring pressed plunger 166 will engage the notch 164 in the rod 154. The notches in the rods 62 and 154 are V-shaped to correspond to the shape of the plungers 166 and 167. These plungers do not lock the rods positively but hold them in their positions and allow them to be shifted as may be desired.

When the foot plate 82 is in the position N and the lever 240 is held against the face 310 of slot 246, the frame will be stopped at the end of the second period of its first cycle and the lever 240 will travel to the bottom of the slot $N^2$. If the foot plate 82 should be at either of the positions R 1 3 or 2, there would be nothing to prevent the pedal being moved forward and into the third period of its first cycle. It is obvious from the foregoing description, the first period of the first cycle of the frame 58 serves merely to disengage the motor from the driving mechanism.

After passing through the first period of the first cycle the roller 222 will ride over the larger portion of the cam 220 and the clutch 201 will be held out of engagement with the fly wheel of the motor during the second period of the first cycle. It is obvious that after the clutch is disengaged the cam plates will operate the gears 265 and 280 to return them to their normal positions, and the frame 58 being held in its normal position by a spring, will be free to return to its normal position after the completion of second period of its first cycle.

Third period of the first cycle of the frame 58 will now be described. As has already been mentioned, the dial on the foot pedal has the letters and numerals R—1—N—3—2, each of these corresponding to the following operations: R refers to the operation necessary to reverse the mechanism, so that the machine will move backward, when the clutch is engaged with the motor, and the foot pedal has been set to indicate R and has been operated through the first cycle of this movement: 1 refers to the first or low speed of the motor, imparting the slowest motion to the rear wheels in relation to the number of revolutions the fly wheel is making. The letter N, as has already been described, refers to the neutral position, and in which position no gears will be thrown into engagement: 3 corresponds to the highest forward speed; 2 is the intermediate or second speed, and of course, refers to a speed lower than third and higher than the first. The method of shifting the gears in the gear box by the foot pedal will now be described.

If it is desired to back the machine, the operator inserts his foot in the plate 82 which is attached to the frame 58. He turns the plate 82 until the pointer 83 registers R; he then pushes the pedal forward, moving the frame 58 through the first period of its first cycle and disengaging the clutch from the motor.

The frame 58 then passes through the second period of its first cycle.

As the frame 58 starts in the first period of its first cycle the lever 240 will enter the slot $R^2$ on the guide plate 243; at the same time the rocker arm 94 will lift the rod 100, causing the block 102 to pass a pin 110 and bringing the block 101 into engagement with the pin 109, and will hold the pin 109 outward against the tension of its spring and into the path of the lever 127.

As the frame 58 proceeds through the third period of its first cycle, the pin 109 will bear against the face of the lever 127 and will act to move the arm 126 downward and through the link 129ª and the arms 127ª and 128ª will move the rod 62 rearwardly so that the plunger will enter the slot 160 on the rod 62. At the same time the shifting finger 137 will move backward with the rod 62 and will cause the gear 265 to engage the idler gear 276.

The cam 220 which operates the clutch mechanism through the lever 222 will hold the clutch out of engagement with the fly wheel while the frame 58 is moving through the third period of its first cycle. The frame 58 is then allowed to return to its normal position by relieving the pressure of the foot and the frame being carried backward by a spring. The cam plate 180 being pivoted at 170 and held against the pin 109 will strike the cam lever 190 and pass the cam lever without moving it as the frame 58 passes through its second cycle.

As the roller 222 rides over the cam 220, the roller 222 will pass to the lower portion 221 of cam and will allow the clutch to reengage the fly wheel of the motor. It will be noticed that the disengaging of the clutch occurs at the beginning of the first period of the first cycle, and the reëngaging of the clutch occurs at the latter portion of the second cycle of the frame 58. As the clutch 201 reëngages the fly wheel and is caused to rotate in unison therewith, it will impart a rotary movement to the shaft 68 which has fastened to its rear end the gear 260, which engages the gear 274 which is fastened to the shaft 270. Movement is thereby imparted to the shaft 270 which in turn imparts like movement to the gear 271 attached to the rear end of the shaft 270. The idler pinion 276 which is in engagement with the gear 271 in turn imparts movement to the gear 265 which causes the shaft 69 to rotate in the counter or reverse direction of the shaft 68.

If the foot plate 82 now be moved to the position 1 and passes through the first period of its first cycle, the clutch 201 will be disengaged from the fly wheel. The lever 240 will have entered the slot 1² of the guide plate 243.

After the frame 58 has completed the third period of its first cycle when the foot plate is set to the position R, the lever 127 rotating about its center raises cam lever 190. This lever is left in this position and remains there until the frame 58 is again moved through the second period of its first cycle. In this case the foot plate is set to move the gears in the gear box to correspond to the first speed, and before the frame 58 can enter its third period of its first cycle, the cam levers 190 and 192 must pass between the faces of the cam plates 180, 181, 182 and 183; and as the cam face 190 has been raised so that it will engage the face 301 of cam plate 180, the frame 58 in passing through the second period of its first cycle, will press the cam lever 190 downward, thus rocking the arm 126 upward and acting through the link 129ª and the arms 127ª and 128ª will move the rod 62 forward and to its neutral position, so that the plunger 167 will again engage the notch 161. As the rod 62 is moved forward the shifting finger 137 is also moved forward until the gear 267 resumes a neutral position and disengages the pinion 276.

As the frame 58 enters the third period of its first cycle the rod 100 having been moved to such a distance as to carry the block 102 into engagement with the pin 110 and projecting it outward from the frame 58 so that its point will engage the lever 126ª, and as the frame 58 continues to move through the third period of its first cycle, the lever 126ª will be moved downward, the arm 126 will be raised and acting through the link 129ª and the arms 127ª and 128ª, the rod 62 will be moved forward until the plunger 167 will enter the slot 162. The shifting finger 137 at the same time being carried forward will bring the gear 265 into engagement with the gear 272. After the frame 58 has completed its first cycle, the pressure of the foot is relieved and the frame allowed to return to its normal position, the plate 181 passing the cam lever 190 without moving it.

At the end of its second cycle the roller 222 passes again to the lower portion 121 of the cam 220 and allows the clutch to reëngage the fly wheel of the motor. In doing so the rotary motion is imparted to the shaft 68 and is transmitted through the gear 260 to the gear 274, the gear 274 being attached firmly to rod 270 and imparting its movement to gear 272, which is also attached firmly to the shaft 270. The gear 272 in turn imparts movement to the gear 265, which in turn imparts movement to the shaft 69 through the splines 264.

It will be noticed that the shaft 69 in this position will rotate in the same direction as the shaft 68, but the ratio of the gears 272 and 265 is such that the shaft 69 will rotate much slower than the shaft 68, thus giving the machine its slowest forward movement.

The operator may now move the foot plate 82 to the position 2 and by pressing the frame 58 forward which will operate through the cam 220 to release the clutch from the motor as it passes through the first period of its first cycle. As in the previous operation of the pedal when the pointer 83 was set to the position 1, the cam 190 is moved downward and as the frame 58 passes through the second period of its first cycle, the face 302 of the cam 181 will engage the cam lever 190 and move it to its normal position, which acting through the arms 126, the link 129ª, the arms 127ª and 128ª will move the rod 62 backward until the plunger 167 again engages the neutral notch 161 and the gear 265 is disengaged from the gear 272, thus throwing the gears in the gear box to neutral positions.

As the frame 58 enters the third period of its first cycle and as the lever 240 is passing through the slot 2², the rocker arm 93 will raise the rod 96 until the block 98 passes the rod 106ª and the block 97 is left in engagement with the pin 103. This setting of the pin 103 is accomplished at the same time the foot plate 82 is moved to the position 2.

The pin 103 will be projected outward against its spring 104 from the frame 58 until it comes in the path of the lever 142. The pin bearing against the upper face of the lever 142 will move the frame 140, moving its arm 145 downward and acting through the link 146 and the arm 147 to rotate the sleeve 149 moving the arm 152, so as to move the rod 154 backward until the plunger 166 enters the notch 163. The shifting finger 158 will also be carried backward and as it engages the groove on the hub of the gear 280, will move the gear 280 backward at the same time and into engagement with the gear 273. The frame 58 is again allowed to return to its normal position, through its second cycle, the cam plate 183 passing the cam lever 191, and at the last portion of the second cycle the roller 222 passes to the lower portion 221 of cam 220 allows the clutch again to reëngage the fly wheel of the motor. The motion of the motor is thereby imparted through the clutch 201 to shaft 68, which is in turn transmitted through the gear 260 to the gear 274, which as has been stated before, is fastened firmly to the shaft 270. The gear 273 being also attached firmly to the shaft 270 will impart movement to the gear 280, which in turn being keyed to the shaft 69 will in turn impart the movement to this shaft. The gears 273 and 280 are in such ratio as to impart a greater degree of movement to the shaft 69 as produced in the shaft 68, than is imparted to it when the gears 272 and 265 are in engagement, thus giving the shaft 69 its intermediate or second forward speed.

After the frame 58 has returned to its normal position, the foot plate 82 can be again moved to position 3. In this position when the frame 58 is rocked through the first period of its first cycle, the clutch is again disengaged from the fly wheel of the motor.

As the frame 58 starts through the first period of its first cycle the lever 240 engaging slot 3², the position of the rod 96 will be such that the block 98 will engage the rod 106ª, pressing it outward and in the path of the lever 143. As the frame 58 passes through the second period of its first cycle the cam plate 303 will engage the cam lever 191 and rock the frame 140 to its normal position and through the link 146 and the sleeve 149 will move the rod 154 until the plunger 166 again engages the neutral slot 164.

As the frame 58 passes onward and into the third period of its first cycle, the rod 106ª will engage the lever 143 and through arm 145 will raise the link 146 and through the lever 147 will rock the sleeve 149, moving the lever 152 forward and imparting a like forward movement to the rod 154 until the plunger 166 engages the notch 165. The shifting finger 158 will in turn move the gear 280 forward.

The gear 280 as previously described, has an internal gear cut on its forward side which conforms to the gear 260. The gear 280 will thus slip over the face of the gear 260 and the teeth of internal portion 285 of gear 280 will engage the exterior portion of the gear 260, and as the gear 280 is keyed to the shaft 69, the two shafts 68 and 69 will thus become locked together and the same movement that the shaft 68 receives will likewise be imparted to the shaft 69, the two thus rotating in unison. As the frame 58 returns to its normal position, the cam plate 182 passes the cam lever 191 and at the last portion of the second cycle the roller 222 will again pass to the lower portion of cam 220 and the clutch will again engage the fly wheel of the motor and the movement of the motor will thus be imparted to the shaft 68. The shafts 68 and 69 being then locked firmly together, the shaft 69 will rotate in unison with the shaft 68 and will thus impart the highest or third forward speed to the mechanism.

The movements of the frame have been described in their regular order, that is, beginning with the reverse position, then taking up the first or lowest speed, then the second or intermediate speed, and then the third or highest speed. It is obvious, however, that it is not necessary to go through all of these movements as the device is so constructed that when the frame 58 passes through the second period of its first cycle it always returns to neutral position any gears that may have been set by a previous operation. It is also to be noticed that as the frame 58 is rocked through the second period of its first cycle it may return all parts to neutral position when the foot plate is set to either of its five positions, unless the operator should desire to merely throw out the clutch, in which case he moves the frame 58 only far enough to accomplish this result, or if the lever 240 is in the slot N² it may be moved to the side 300 of the slot and will be stopped at the shoulder 245. This is to prevent the possibility of the operator throwing the gears to neutral position when he merely desires to disengage his clutch. However, if it is only desired to return the gears to normal position he allows the lever 240 to go to the bottom of the slot N². The setting of any of the gears is thus prevented after they have been returned to their normal position. When the frame 58 is in its normal position the foot plate 82 is free to be moved to any of its positions, but as soon as it enters the first period of its first cycle, the lever 240 must enter one of the slots R² 1² N² 2² 3² and after entering these slots the position of the plate 82 cannot be changed until the frame 58 is allowed to return to its normal position.

It will also be noticed that the frame 58 may be allowed to return to its normal position when it is set in any of the positions R—1—N—3—2 and at any place in the first cycle. Thus if it should be held in the position R, the operator can move the frame 58 forward until the clutch is released and the gears have been moved to their normal position, but may relieve the pressure and allow the frame 58 to return to normal position without entering the third cycle and thus setting any gears.

Having described our invention, we claim:

1. In an automobile, a clutch, a variable speed transmission mechanism, a selector mechanism, means carrying the selector mechanism, and disconnecting the clutch while the change of speeds of the transmission is effected.

2. In an automobile, a driving mechanism, a source of energy, means for disconnecting the driving mechanism from the source of energy, a driven mechanism, a series of gears for producing various ratios of speed between the driving mechanism and the driven mechanism, a selector mechanism, and a common means carrying the selector mechanism and operating the clutch and the variable speed gears, whereby the gear ratio cannot be changed until the clutch is disconnected.

3. In an automobile, a source of energy, a propelling mechanism, a clutch, variable speed gears between source of energy and the propelling mechanism; an indicator for selecting the gears, and a common means carrying the indicator and being effective to change the gear ratio while the clutch is positively held in its disconnected position.

4. In an automobile, a clutch, a set of variable speed gears, part of which gears are positively driven when the clutch is connected, and other gears which normally are not engaged with the positively driven gears, an indicator, a common means for carrying the indicator and disconnecting the clutch and connecting the normally disengaged gears with the positively driven gears; the same common means holding the clutch positively out of engagement while the gears are being engaged.

5. In an automobile, a clutch, a driving shaft, a driven shaft, transmission elements interposed between the shafts, an indicator, a lever carrying the indicator and disconnecting the driving shaft from the driven shaft and again connecting the driving shaft to the driven shaft while the clutch is positively held in a disconnected position.

6. In an automobile, a clutch, a driving shaft, a driven shaft, a series of gears for connecting the driving shaft to the driven shaft, an indicator, a common means for carrying the indicator and disengaging the gears between the driving shaft and the driven shaft and holding the clutch in a disconnected position while the driven shaft is being disconnected from the driving shaft.

7. In an automobile, a clutch, a driving shaft, a driven shaft, a series of gears connecting the driving shaft to the driven shaft, a common means for disconnecting the gears between the driving shaft and the driven shaft and holding the clutch disconnected while the shafts are being disconnected, and preventing the shafts from being again connected.

8. In an automobile, a clutch, a driving shaft, a driven shaft, a series of variable speed gears for connecting the driving shaft to the driven shaft, an indicator for showing the gears that have been selected, common means for carrying the indicator and disconnecting the clutch when the predetermined set of gears are being engaged to connect the driving shaft to the driven shaft.

9. In an automobile, a clutch, a driving shaft connected to the clutch, a driven shaft, a selector means, means for connecting the two shafts and a single lever carrying the selector means and disconnecting the clutch and operating the means for connecting the shafts.

10. In an automobile, a clutch, a set of variable speed gears, a selector mechanism for selecting a certain combination of gears, and means for preventing the changing of the selector mechanism while the clutch is disconnected, and the change of gears is being effected.

11. In an automobile, a swinging lever, an indicator attached to the lever, means for setting the indicator, while the lever is in its normal position, and means for preventing the changing of the position of the indicator when the lever is moved from its normal position.

12. In an automobile, a driving mechanism, a driven mechanism, a clutch, a swinging lever, a series of cam plates, carried by the swinging lever, a cam lever that co-acts with the cam plates to disengage the driven mechanism from the driving mechanism only when the clutch is disconnected.

13. In an automobile, a clutch, a series of variable speed gears, an indicator, means for carrying the indicator and disconnecting the gears and again connecting them, the same means disconnecting the clutch while the gears are being disconnected and again connected.

14. In an automobile, a clutch, a set of variable speed gears, a selective operating means, an indicator carried by the selective operating means, said selective operating means disconnecting the gears and again connecting a pre-determined set of gears as shown by the indicator, and disconnecting the clutch and holding it disconnected while the gears are being connected.

15. In an automobile, a clutch, a set of variable speed gears, setting means for the gears, a common means for disconnecting the clutch and returning the gears to a neutral position, and means for preventing the setting means from rendering any of the gears effective.

16. In an automobile, a clutch, a set of variable speed gears, a common means for disconnecting the clutch and disengaging the gears and additional means for preventing the common means from disengaging the gears when the clutch is disconnected.

17. In an automobile, a clutch, a set of variable speed gears, a common operating means between the clutch and the variable speed gears having a primary selective movement for the gears and a secondary operative movement for the clutch and the gears.

18. In an automobile, a clutch, a set of variable speed gears, a common operating means between the clutch and the variable speed gears, having a primary selective movement for the gears, and a secondary operative movement for the gears and the clutch, the clutch being disconnected during the operative movement, while the results as selected are accomplished in the same cycle.

19. In an automobile, a clutch, a set of variable speed gears, a common operating means between the clutch and the variable speed gears, having a primary selective movement for the gears and a secondary operative movement, the operative movement disconnecting the clutch and holding it disconnected during this entire cycle, while the results of the selective movement are accomplished in the same cycle, and means for preventing the alteration of the selective movement during the operative movement.

20. In an automobile, a clutch and a variable speed mechanism, a common operating means for both, an indicator, a shaft on which the common operating means is loosely mounted, a spring carried by said shaft for holding the indicator in notches, said notches being so shaped that the indicator can be moved against the pressure of its spring.

21. In a transmission mechanism, sets of variable speed gears, operating elements for effecting the changes of speed, selective elements for the various sets of gears, the selective elements being carried by the operating elements and operable to select the gears only before the operating elements become effective to effect the changes of gears.

BYRON BLISS WELLS.
LESLIE WALTER LAPP.

Witnesses:
EDIS G. ROBINSON,
Z. J. HOWE.